US011872906B2

United States Patent
Fatemi et al.

(10) Patent No.: US 11,872,906 B2
(45) Date of Patent: Jan. 16, 2024

(54) OPERATOR-SELECTED OPERATION OF ELECTRIC PROPULSION SYSTEM HAVING RECONFIGURABLE SERIES/PARALLEL VOLTAGE SOURCE

(71) Applicant: GM GLOBAL TECHNOLOGY OPERATIONS LLC, Detroit, MI (US)

(72) Inventors: Alireza Fatemi, Canton, MI (US); Thomas W. Nehl, Shelby Township, MI (US); Chandra S. Namuduri, Troy, MI (US); Lei Hao, Troy, MI (US); Norman K. Bucknor, Troy, MI (US); Rashmi Prasad, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 477 days.

(21) Appl. No.: 17/313,257

(22) Filed: May 6, 2021

(65) Prior Publication Data

US 2022/0355703 A1 Nov. 10, 2022

(51) Int. Cl.
*B60L 58/19* (2019.01)
*B60K 1/00* (2006.01)
(Continued)

(52) U.S. Cl.
CPC ............ *B60L 58/19* (2019.02); *B60K 1/00* (2013.01); *B60K 35/00* (2013.01); *B60L 3/04* (2013.01);
(Continued)

(58) Field of Classification Search
CPC .. B60L 58/19; B60L 3/04; B60L 15/20; B60L 2240/425; B60L 2250/00;
(Continued)

(56) References Cited

U.S. PATENT DOCUMENTS

| | | | | |
|---|---|---|---|---|
| 7,124,691 B2 * | 10/2006 | Donnelly | ............... | B60L 58/18 |
| | | | | 105/26.05 |
| 10,940,771 B1 * | 3/2021 | Fatemi | ................ | B60L 58/19 |

(Continued)

FOREIGN PATENT DOCUMENTS

| | | | | | |
|---|---|---|---|---|---|
| CN | 107128189 A | * | 9/2017 | ............. | B60L 58/19 |
| CN | 110015134 A | * | 7/2019 | ............. | B60L 58/19 |
| KR | 20190027450 A | * | 3/2019 | ............. | B60L 58/19 |

OTHER PUBLICATIONS

Translation of CN-107128189-A, 22 pages (Year: 2017).*
Translation of KR-20190027450-A, 4 pages (Year: 2019).*
Translation of CN-110015134-A, 12 pages (Year: 2019).*

*Primary Examiner* — Dale W Hilgendorf
(74) *Attorney, Agent, or Firm* — Quinn IP Law

(57) ABSTRACT

An electric propulsion system includes a rotary electric machine having an output member, a rechargeable energy storage system ("RESS") connected to the electric machine, a user interface device, and a controller. The RESS includes multiple battery modules and a switching circuit, the latter being configured, in response to electronic switching control signals, to connect the battery modules in a parallel-connected configuration or a series-connected configuration, as a selected battery configuration. The user interface device receives an operator-requested drive mode request as an electrical signal indicative of a desired drive mode of the electric propulsion system. The controller, which is programmed with mode-specific electrical loss information associated with the desired drive mode, establishes the selected battery configuration in response to the drive mode request, and presents a drive mode recommendation via the user interface device when the loss information associated with the desired drive mode exceeds a calibrated loss threshold.

20 Claims, 4 Drawing Sheets

(51) Int. Cl.
*B60L 3/04* (2006.01)
*B60K 35/00* (2006.01)
*H02J 7/14* (2006.01)
*H02P 29/032* (2016.01)
*H02P 29/024* (2016.01)
*H02P 29/60* (2016.01)
*B60L 15/20* (2006.01)
*H02P 29/028* (2016.01)

(52) U.S. Cl.
CPC ............ *B60L 15/20* (2013.01); *H02J 7/1423* (2013.01); *H02P 29/024* (2013.01); *H02P 29/032* (2016.02); *H02P 29/60* (2016.02); *B60K 2001/006* (2013.01); *B60K 2370/169* (2019.05); *B60L 2240/425* (2013.01); *B60L 2250/00* (2013.01); *H02P 29/028* (2013.01)

(58) Field of Classification Search
CPC .... B60K 1/00; B60K 35/00; B60K 2001/006; B60K 2370/169; H02J 7/1423; H02J 29/024; H02J 29/032; H02J 29/60; H02J 29/028

See application file for complete search history.

(56) References Cited

U.S. PATENT DOCUMENTS

| | | | |
|---|---|---|---|
| 2019/0165713 A1* | 5/2019 | Namuduri | B60L 58/19 |
| 2019/0283611 A1* | 9/2019 | Conlon | B60L 58/19 |
| 2020/0070667 A1* | 3/2020 | Wang | B60L 58/19 |
| 2021/0078442 A1* | 3/2021 | Prasad | B60L 58/19 |
| 2021/0257843 A1* | 8/2021 | Mituta | B60L 53/62 |
| 2023/0130454 A1* | 4/2023 | Sohn | B60L 58/12 |
| | | | 307/10.1 |

* cited by examiner

OPERATOR-SELECTED OPERATION OF ELECTRIC PROPULSION SYSTEM HAVING RECONFIGURABLE SERIES/PARALLEL VOLTAGE SOURCE

INTRODUCTION

The present disclosure relates to electric propulsion systems having at least one rotary electric machine configured for powering a driven load, and having a reconfigurable battery pack capable of operating in either a series-connected ("S-connected") configuration or a parallel-connected ("P-connected") configuration.

Rotary electric machines in the form of electric traction or propulsion motors are typically energized by an onboard voltage source. In a battery electric or hybrid electric motor vehicle, for instance, the onboard voltage source may include a multi-cell battery pack configured to output an application-specific battery voltage. This occurs directly in a direct current (DC) traction motor, and indirectly via an intervening power inverter module when the electric machine is embodied as a polyphase/alternating current (AC) traction motor. High-power mobile applications traditionally utilize a single battery pack to output the above-noted battery voltage, with the battery pack being rechargeable using an offboard charging station in some configurations.

Battery technologies continue to evolve as manufacturers seek to provide ever-higher charging and output voltages. Potential users of battery electric vehicles, for instance, benefit from an expanding charging infrastructure, including a growing network of direct current (DC) fast-charging stations intended to minimize overall charging time. To that end, multi-module battery configurations exist which take advantage of different maximum charging voltages of AC and DC charging stations, in particular via the automatic selection of a higher-voltage S-connected configuration or a lower-voltage P-connected configuration, with the selection often predicated on the available charging voltage. The electric powertrain system may be constructed using components rated and constructed to handle the higher battery voltages and currents made possible by the S-connected and P-connected configurations, respectively. In such a case, higher performance propulsion modes are also enabled.

SUMMARY

An electric propulsion system is disclosed herein that includes a rotary electric machine, a rechargeable energy storage system (RESS) electrically connected thereto, a user interface device, and an electronic control unit ("controller"). In a possible embodiment, the RESS includes multiple battery modules and a switching circuit, with the latter configured to selectively interconnect the battery modules in either a parallel-connected ("P-connected") configuration or a series-connected ("S-connected") configuration of the type noted generally above. This occurs in response to a corresponding electronic switching control signal from the controller, e.g., a first or second electronic switching control signal for commanding the P-connected or S-connected configuration, respectively.

As described in detail herein, the user interface device is configured to receive an operator-requested drive mode request in the form of an electrical signal indicative of a desired drive mode. The controller, which is in communication with the user interface device, may be programmed with mode-specific electrical loss information, i.e., predetermined or estimated losses associated with sustained operation in the operator's desired drive mode. Other embodiments may use different criteria such as but not limited to electric driving range, state of charge, available output power, etc., to name just a few. The controller selects and establishes the P-connected or S-connected configuration as a selected battery configuration in response to such a drive mode request. Thereafter, the controller selectively presents a drive mode recommendation to the operator via the user interface device, such as when the electrical loss information exceeds a calibrated loss threshold.

The controller may be optionally configured to detect an onset of a drive cycle, and to receive the operator-requested drive mode signal via the user interface device at the onset of the drive cycle. In some embodiments, the controller may receive the drive mode signal via the user interface device during the drive cycle, and may command a transition from the P-connected configuration to the S-connected configuration, or vice versa, anytime during the duration of the drive cycle.

Alternatively, the controller described herein may command the transition from the P-connected configuration to the S-connected configuration, or vice versa, during the drive cycle when the electric propulsion system is stationary.

In an aspect of the disclosure, the controller is configured to detect an electrical fault condition or limit of the electric propulsion system. In such an embodiment, the controller automatically selects the P-connected configuration or limits output power in the S-configuration in response to the electrical fault condition or limit.

For instance, a cooling system may be configured to regulate temperature of the rotary electric machine, in which case the electrical fault or limitation could include an electrical fault or limitation of the cooling system, and/or a temperature of the RESS regulated by such a cooling system. The P-connected configuration may include multiple different P-connected configurations.

The switching circuit in a possible non-limiting implementation includes nine or more switches, with a representative four-voltage embodiment using such a switching circuit being described herein.

In some configurations, the controller is operable for presenting, via the user interface device, an expected electric range penalty or bonus for the drive mode recommendation, with the controller possibly doing so based on the mode-specific electrical loss information or other criteria.

In such a configuration, or alternatively in other configurations, the user interface device may present an expected power level penalty or bonus for the selected drive mode or the drive mode recommendation based on the mode-specific electrical loss information.

The driven load in certain embodiments includes one or more road wheels of a motor vehicle.

A mode selection method is also disclosed herein for the above-summarized electric propulsion system. The method may include determining the mode-specific electrical loss information associated with a desired drive mode of the electric propulsion system. The method in this embodiment also includes selectively presenting a drive mode recommendation via a user interface device when the mode-specific electrical losses associated with the desired drive mode exceeds a calibrated loss threshold.

As part of the disclosed method, the controller receives the operator-requested drive mode signal from the user interface device, with the drive mode signal being indicative of a desired drive mode of the electric propulsion system. In response to the drive mode signal, the controller selects either the P-connected configuration or the S-connected configuration of the RESS as a selected battery configuration. The RESS includes multiple battery modules and a switching circuit, as noted above, with the method including transmitting electronic switching control signals to a switching circuit of the RESS, via the controller, to establish the selected battery configuration.

A motor vehicle is also disclosed herein. According to an exemplary embodiment, the motor vehicle includes road wheels, a vehicle body connected to the road wheels, and an electric propulsion system connected to the road wheels and the vehicle body. The electric propulsion system in this particular embodiment includes a polyphase rotary electric machine having phase leads and an output member, with the output member being connected to the driven load and configured to impart a motor torque to the driven load. The above-summarized RESS or one having additional P-connected configurations is electrically connected to the rotary electric machine. The switching circuit is configured, in response to electronic switching control signals, to selectively connect the battery modules in either a P-connected configuration (one or more) or an S-connected configuration.

As part of the motor vehicle, a user interface device is configured to receive an operator-requested drive mode signal indicative of a desired drive mode of the electric propulsion system, possibly defaulting to the P-connected configuration absent receipt of such an operator-requested drive mode signal. A controller in communication with the user interface is programmed with the mode-specific electrical loss information associated with the desired drive mode. The controller is configured to select either the P-connected configuration or the S-connected configuration via control of the switching circuit, which occurs in response to the drive mode signal. The controller also presents a drive mode recommendation and an expected electric range and/or power penalty or bonus for the drive mode recommendation based on the mode-specific electrical loss information via the user interface device when the mode-specific electrical loss information exceeds a calibrated loss threshold.

The above summary is not intended to represent every embodiment or aspect of the present disclosure. Rather, the foregoing summary exemplifies certain novel aspects and features as set forth herein. The above noted and other features and advantages of the present disclosure will be readily apparent from the following detailed description of representative embodiments and modes for carrying out the present disclosure when taken in connection with the accompanying drawings and the appended claims.

Figure 1:
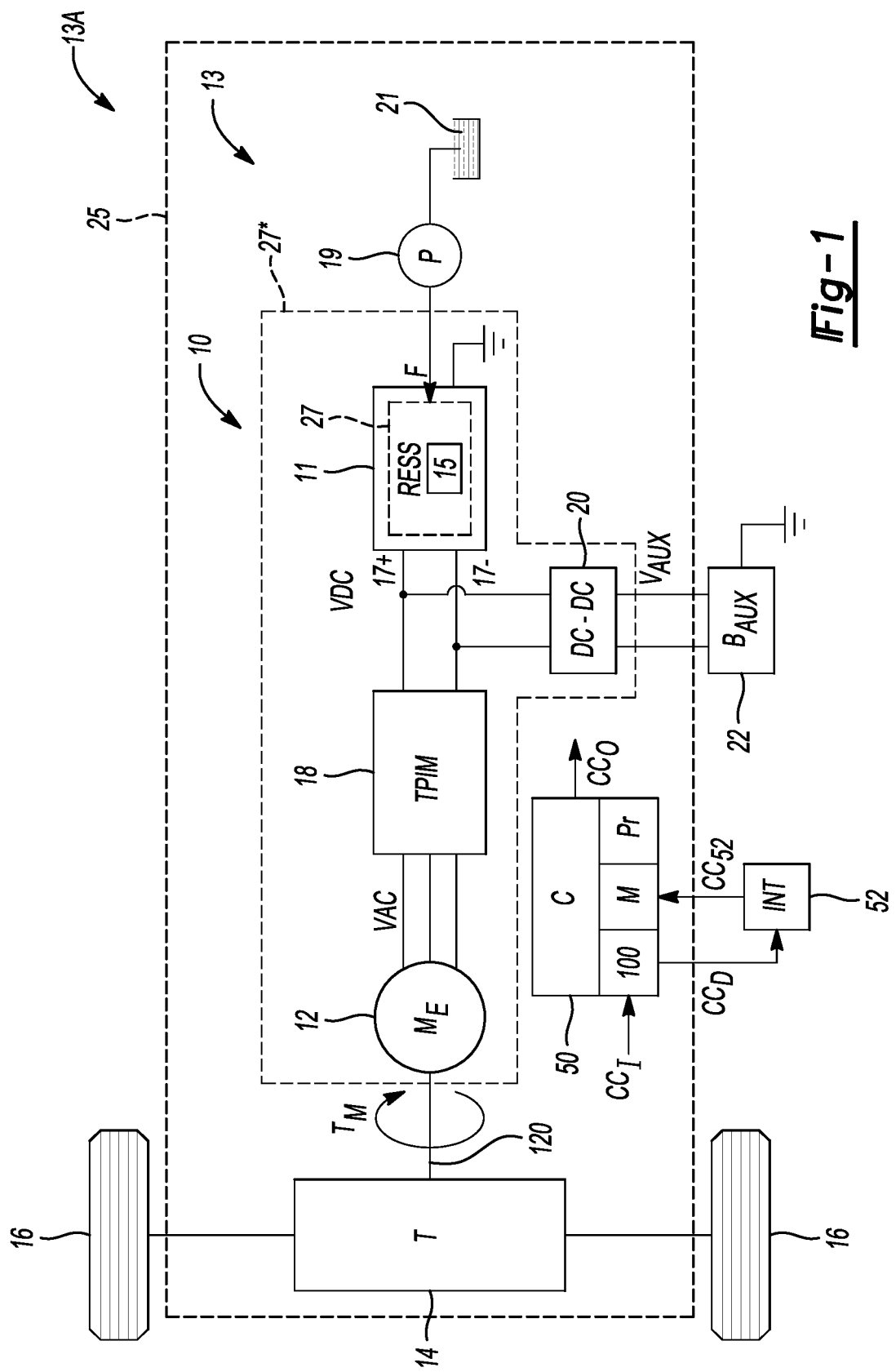
FIG. 1 is a schematic illustration of an exemplary mobile platform having an electric propulsion system, user interface device, and a controller collectively configured to operate as set forth herein.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within ±5% of", or "within acceptable manufacturing tolerances", or logical combinations thereof.

Referring to the drawings, wherein like reference numbers refer to the same or like components in the several Figures, an electric propulsion system 10 is disclosed herein that includes a reconfigurable rechargeable energy storage system ("RESS") 11 and a rotary electric machine ("$M_E$") 12. For simplicity, a single rotary electric machine 12 is depicted in FIG. 1, with the present teachings being applicable to alternative numbers and/or configurations. The electric propulsion system 10 may be used as part of a mobile platform 13, e.g., a battery electric motor vehicle 13A having a vehicle body 25 connected to a set of road wheels 16, with such an embodiment used hereinafter for illustrative consistency. However, those skilled in the art will appreciate that the present teachings may be extended to other types of vehicles or mobile platforms 13, such as but not limited to industrial robots, watercraft, aircraft, tracked vehicles, rail-based vehicles, etc.

The reconfigurable RESS 11 of FIG. 1, in response to an operator's interaction with a user interface device (INT) 52 as described below, is "reconfigurable" in the sense that the RESS 11 is selectively configured with one or more available parallel-connected ("P-connected") configurations and a series-connected ("S-connected") configuration. The particular configuration enables the RESS 11 to provide a mode-specific battery voltage across positive and negative DC bus rails $17^+$ and $17^-$, with the battery voltage level abbreviated "$V_{BAT}$" in FIGS. 2-3.

Figure 2:
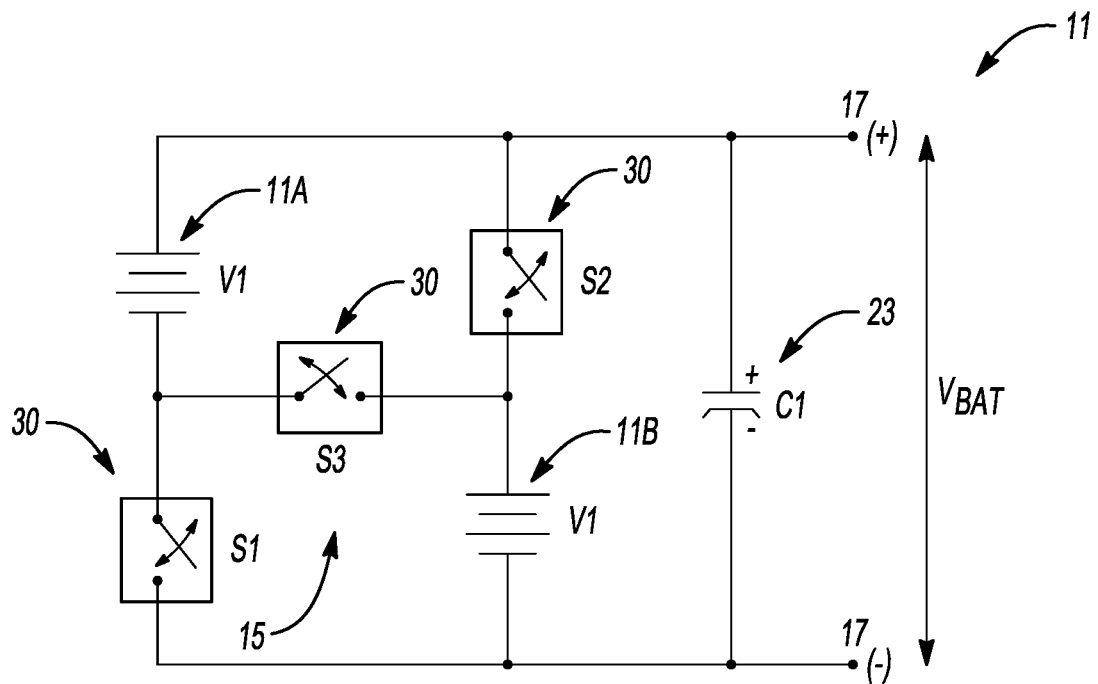
FIG. 2 is a schematic circuit diagram of a dual-module embodiment of a rechargeable energy storage system ("RESS") that is reconfigurable in accordance with the disclosure.
Figure 3:
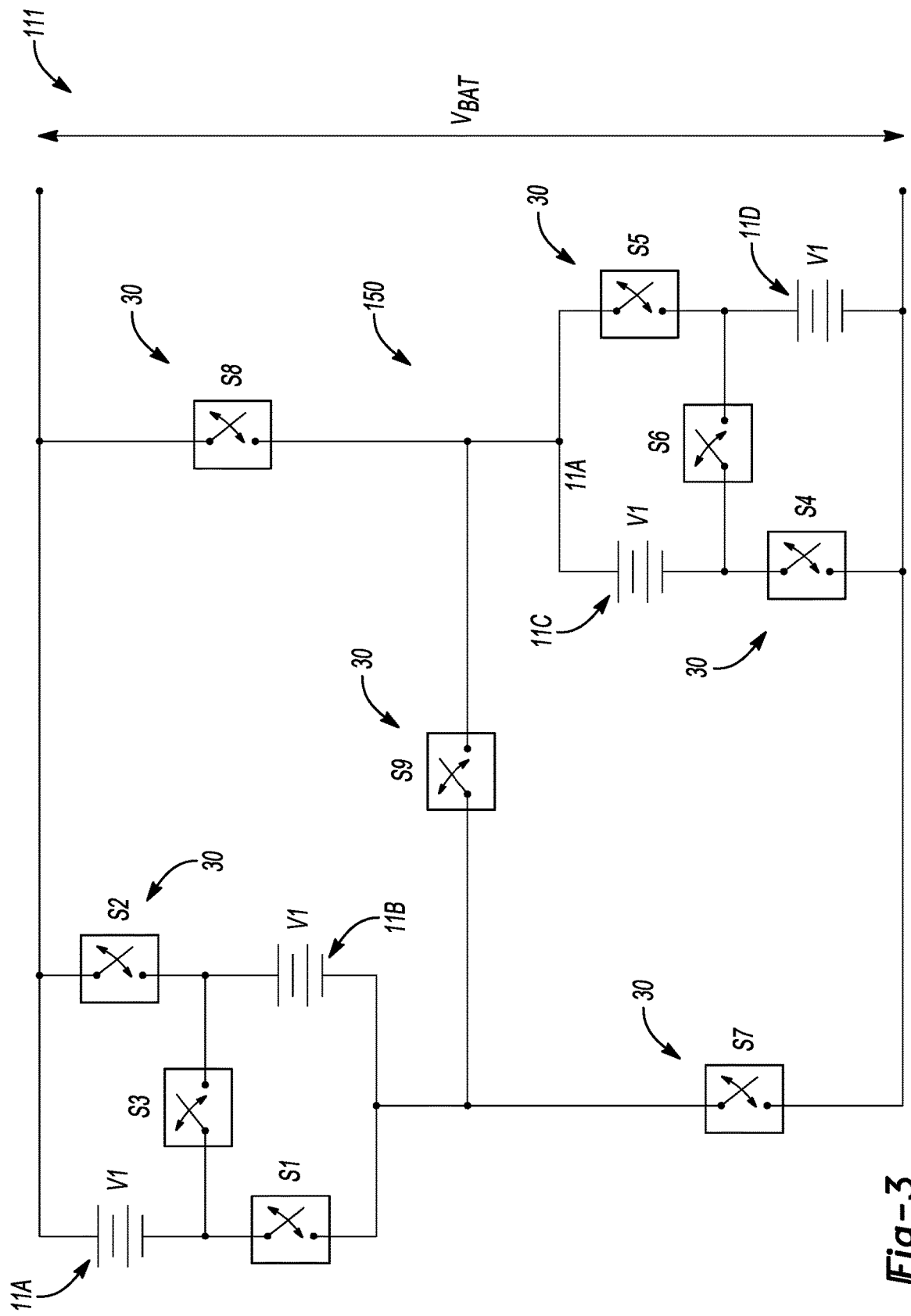
FIG. 3 is a schematic circuit diagram of an embodiment of an RESS in accordance with an aspect of the disclosure.

The provided user-selectable battery configurations described in detail below enable a user to choose between (a) increased power performance at the temporary expense of reduced electrical range and higher electrical losses, and (b) improved electrical efficiency at the expense of temporarily reduced power performance. Exemplary embodiments of the reconfigurable RESS 11 are shown in FIGS. 2 and 3 depicting two possible options, with the present teachings being readily extendable to various alternative configurations of the RESS 11 having one or more P-connected configurations and associated drive modes, and an S-connected configuration/drive mode.

A controller (C) 50 forms an integral part of the electric propulsion system 10. The controller 50 is configured to execute instructions embodying a method 100, an example of which is described below with particular reference to FIG. 4. The controller 50 envisioned herein includes at least one processor ("Pr"), e.g., a central processing unit having one or more processing cores, and application-suitable levels and types of computer-readable memory (M). The memory (M) may include tangible, non-transitory memory, e.g., read only memory, whether optical, magnetic, flash, or otherwise. The controller 50 also includes sufficient amounts of random-access memory, electrically-erasable programmable read only memory, and the like, as well as a high-speed clock, analog-to-digital and digital-to-analog circuitry, input/output circuitry and devices, and appropriate signal conditioning and buffer circuitry.

In executing the present method 100, the controller 50 receives input signals (arrow $CC_I$) inclusive of an operator-requested drive mode signal (arrow $CC_{52}$) from the user interface device 52, e.g., a voltage signal or other suitable electrical signal, which is indicative of an operator-requested drive mode. Other components of the input signals (arrow $CC_I$) include a requested output torque and/or speed of the electric machine 12, e.g., from an accelerator pedal and brake pedal (not shown), predetermined electrical loss information for the various possible drive modes, and calibrated operating limits of the electric machine 12 and its associated power electronics. As appreciated in the art, such limits typically include a maximum torque, current, and operating speed of the electric machine 12. The input signals (arrow $CC_I$) also include signals indicative of detected or diagnosed electrical faults and/or limits of the electric machine 12 and RESS 11, as such conditions arise, with such information being representative of the thermal management and electrical health.

In response to the input signals (arrow $CC_I$), the controller 50 of FIG. 1 outputs control signals (arrow $CC_O$) to a switching circuit 15 (FIG. 2) or 150 (FIG. 3) to transition from an S-connected configuration of the RESS 11 to an available P-connected configuration, or vice versa. This control action occurs, absent a detected fault or limit, in response to the operator-requested drive mode signal (arrow $CC_{52}$) from the user interface device 52, and thus provides possible advantages relative to methods utilizing automatic mode selection.

The reconfigurable RESS 11 depicted in FIG. 1 includes a cooling system 27 configured to regulate temperature of the RESS 11 and its associated power electronics. While shown schematically for illustrative simplicity, the cooling system 27 may include coolant channels and/or conduit, heat-radiating cooling fins and/or plates, and other structure suitable for directing coolant (arrow F) from a coolant supply 21 through the RESS 11. For instance, a coolant pump (P) 19 may be used to circulate coolant (arrow F) through or around constituent battery cells (not shown) of the RESS 11. Such a cooling system 27 may also be extended to cool other electronic components in FIG. 1, e.g., as a cooling system 27*, with such electronic components including the rotary electric machine 12, a traction power inverter module (TPIM) 18, and a direct-current-to-direct current (DC-DC) converter 20. Thus, the boundaries of the cooling system 27* may extend well beyond the envelope of the RESS 11, as will be appreciated by those of ordinary skill in the art. Likewise, the cooling system 27* may encompass multiple interconnected or separate cooling subsystems or loops, such as a respective loop for each of the RESS 11, the TPIM 18, the electric machine 12, the DC-DC converter 20, etc.

The rotary electric machine 12 in the illustrated battery electric vehicle embodiment of FIG. 1 includes an output member 120 that is mechanically connected to a driven load, e.g., a transmission (T) 14 coupled to the road wheels 16. Motor output torque (arrow $T_M$) from the electric machine 12 is transmitted via the transmission 14 to the road wheels 16 to power the road wheels 16 and thereby propel the mobile platform 13. The electric machine 12 may be optionally embodied as a polyphase/alternating-current (AC) device having phase leads connected to an AC-side of the TPIM 18, such that the TPIM 18 outputs an AC voltage (VAC) to phase leads of the electric machine 12. As will be appreciated, power inverter modules such as the TPIM 18 include internal IGBTs, MOSFETs, or other applicable-suitable semiconductor switches each having a corresponding ON/OFF state that is controlled via pulse-width modulation (PWM), pulse-density modulation (PDM), or another switching control technique.

A DC-side of the TPIM 18 is also connected to the RESS 11 via the positive and negative bus rails $17^+$ and $17^-$, respectively, such that a DC voltage (VDC) is present across the bus rails $17^+$ and $17^-$, with the voltage as measured across the output terminals (not shown) of the RESS 11 referred to hereinafter as the battery voltage ($V_{BAT}$). The DC-DC converter 20, also referred to in the art as an auxiliary power module, may be employed to selectively reduce the DC bus voltage to auxiliary voltage ($V_{AUX}$) levels, typically 12-15V. An auxiliary battery ($B_{AUX}$) 22 such as a lead-acid battery may be connected to the DC-DC converter 20 and used to power auxiliary or low-voltage accessories (not shown) aboard the mobile platform 13.

As will be appreciated, a battery pack with a relatively high C-rate, i.e., the particular rate at which the battery pack is charged or discharged, produces more energy per battery cell relative to a battery pack having a relatively low C-rate, with the concept of C-rate being roughly analogous to the battery pack's amp hour rating. The RESS 11, if configured with a high C-rate, may at times experience faults or loads on the cooling system 27 and/or the battery cells and other electronic hardware components of the RESS 11. For example, the cooling system 27 shown schematically in FIG. 1 may be unable to handle the full thermal load of the TPIM 18, the electric machine 12, and the RESS 11, such as during sustained operation of the electric propulsion system 10 in hot ambient weather conditions, when the load is high, etc. Overheating can likewise degrade the C-rate of the RESS 11. The controller 50 is therefore programmed to account for such faults and limits of the cooling system 27 and/or other hardware of the RESS 11 when responding to the user's selection between the available P-connected and S-connected configurations, with the controller 50 possibly making the configuration selection contrary to the user's selection in the face of such faults or limits.

Referring to FIG. 2, the RESS 11 contemplated herein includes a pair of battery modules 11A and 11B in a simplified embodiment. A DC link capacitor (C1) 23 may be connected across the bus rails $17^+$ and $17^-$ as shown. Constituent battery cells (not shown) of the battery modules 11A and 11B may be constructed from lithium, nickel-metal hydride, or another suitable high-energy battery chemistry as appreciated in the art. The term "module" as it relates to the reconfigurable RESS 11 in the present disclosure refers to an application-specific collection of interconnected battery cells, collectively housed together in a common battery housing (not shown). Also not shown for simplicity but well understood in the art, a cell sense circuit is typically mounted to such a battery housing and used to monitor cell parameters, i.e., temperature, voltage, current, etc. Thus, each battery module 11A and 11B effectively operates as a discrete battery in its own right, with the battery modules 11A and 11B connectable in series or parallel to provide the battery voltage ($V_{BAT}$) at a particular level.

Shown in simplified schematic form for added clarity, the switching circuit 15 noted above includes multiple binary (ON/conducting and OFF/non-conducting) switches 30, the switches 30 being individually labeled as S1, S2, and S3 for clarity. Switch S1 is connected between the negative (−) terminal of battery module 11A and the negative bus rail 17⁻. Switch S2 is connected between the positive (+) terminal of battery module 11B and the positive bus rail 17⁺. Switch S3 in turn is connected between the negative (−) terminal of battery module 11A and the positive (+) terminal of battery module 11B.

To establish the P-connected configuration of FIG. 2, in response to the operator-requested drive mode signal (arrow $CC_{52}$) the controller 50 depicted in FIG. 1 commands the switches S1 and S2 to close and switch S3 to open, which in turn causes the battery voltage $V_{BAT}$ to equal the module voltage (V1). In a non-limiting representative embodiment, for instance, the module voltage of the battery modules 11A and 11B may be about 300-400V, and thus $V_{BAT}$ is about 300-400V in such a scenario. When an operator of the electric propulsion system 10 of FIG. 1, via the operator-requested drive mode signal (arrow $CC_{52}$), communicates a desire for an increase in the battery voltage $V_{BAT}$, the controller 50 may respond by closing switch S3 and opening switches S1 and S2. Such a control action establishes the S-connected configuration. With the two battery modules 11A and 11B connected in this manner, the resulting S-connected configuration of the RESS 11 sets the battery voltage ($V_{BAT}$) equal to the sum of the individual module voltages, i.e., V1+V1, or about 600-800V in keeping with the above 300-400V example.

Selection of the S-connected configuration offers torque and power boost capabilities at higher rotational speeds of the electric machine 12. In such an embodiment, the controller 50 could progressively limit the high-speed torque and power performance of the electric propulsion system 10 as needed in response to the above-noted faults or limitations. The various embodiments described herein require construction of hardware components rated for the higher voltage level, with overall control of the switching operation of the RESS 11 and operation of the rotary electric machine 12 being maintained during transitions between the P-connected and S-connected configurations so as to minimize driveline disturbances and current transitions.

Those skilled in the art will appreciate that other configurations of the RESS 11 may be contemplated within the scope of the present teachings. Referring briefly to FIG. 3, an RESS 111 in an alternative configuration may include the switching circuit 150, individual switches 30 of which may be arranged with respect to battery modules 11A, 11B, 11C, and 11D. Nine such switches 30 are used in this representative circuit topology, with additional switches 30 being possible in other embodiments depending on the number of interconnected battery modules.

That is, the switches 30 labeled S1, S2, and S3 may be used to connect battery modules 11A and 11B in series or parallel with each other. The switches 30 labeled S4, S5, and S6 similarly connect the battery modules 11C and 11D in series or parallel with each other. Elsewhere, switches S7, S8, and S9 are controlled analogously to switches S1, S2, and S3 of FIG. 2, i.e., to combine the battery modules 11A and 11B (in series or parallel with each other) with the battery modules 11C and 11D (likewise connected in series or parallel with each other) in the S-connected or P-connected configuration. Relative to the more simplified dual-module embodiment of FIG. 2, therefore, the added number of switches 30 and battery modules in FIG. 3 allows for more than one P-connected configuration and, as a result, a wider range of available user-selectable drive modes and battery voltages ($V_{BAT}$).

As part of the present method 100, the controller 50 of FIG. 1 may be programmed with predetermined or calibrated baseline mode-specific electric drive loss information for the available S-connected configuration and P-connected configuration(s). Such baseline loss information may be used by the controller 50 as set forth below to inform the operator in real-time, via the user interface device 52, of the associated power and/or efficiency or electric range penalty of a given mode selection. Similarly, the controller 50 could inform the operator as to the associated operating efficiency or electric range bonus of a given mode selection, i.e., by presenting a graphic informing the operator of the positive or negative consequences of a given drive mode selection in terms of efficiency, losses, range, power, etc.

The baseline electrical losses may be ascertained offline and stored in memory (M) of the controller 50 shown in FIG. 1. During the course of execution of the method 100, the baseline losses may be extracted from memory (M) and thereafter adjusted or scaled in real-time by the controller 50. For instance, a loss scaling factor could be calculated by the controller 50 based on temperature or other system feedback values. Likewise, baseline peak torque curves may be scaled in real-time based on such calculations to properly account for different operating conditions.

Figure 4:
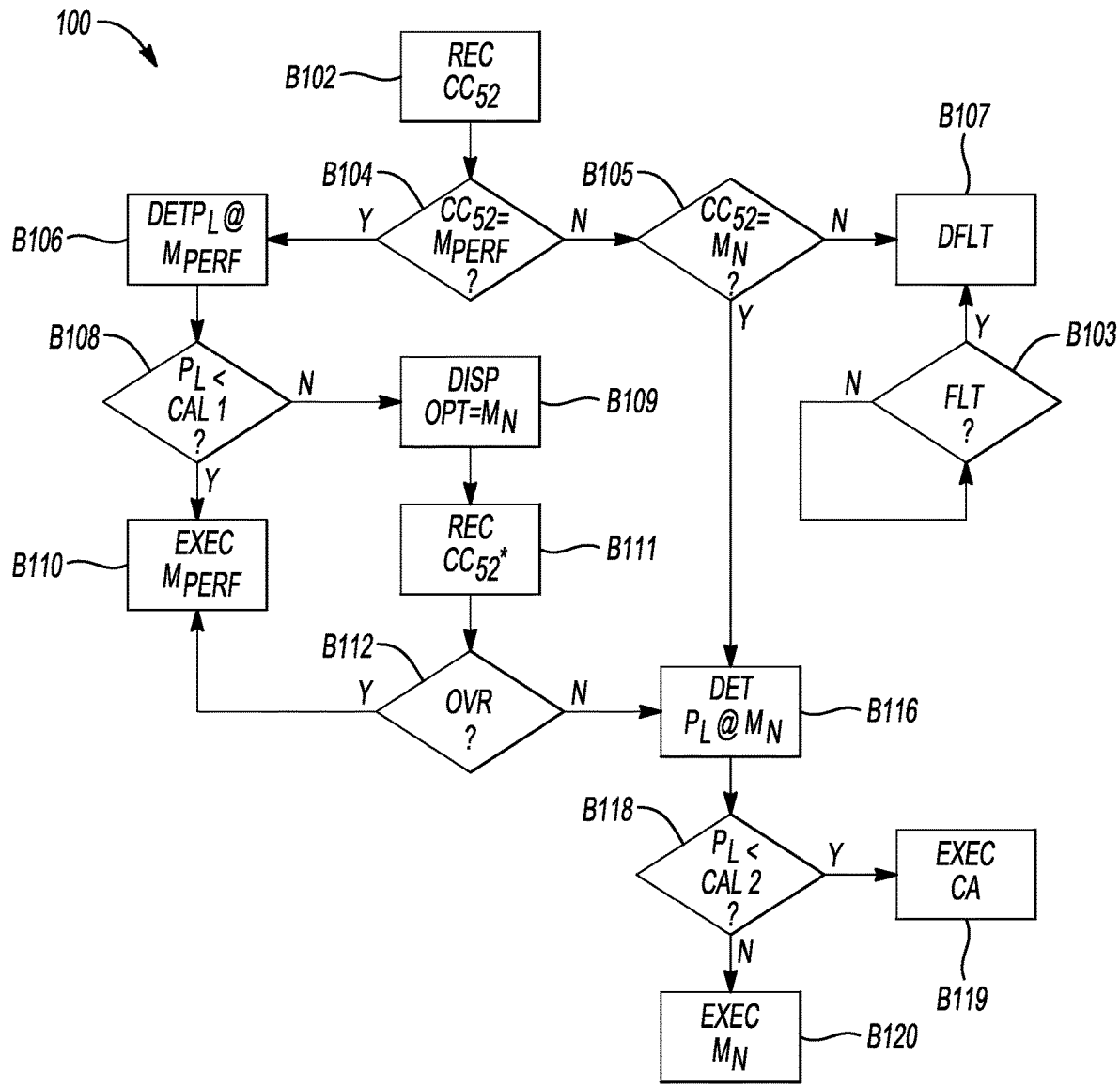
FIG. 4 is a flow chart describing a representative embodiment of a method for use with the electric propulsion system shown in FIG. 1 and other possible embodiments.

Referring to FIG. 4, the method 100 described herein enables user-initiated drive mode selection for the electric propulsion system 10 of FIG. 1. For clarity and conciseness of explanation, the flow chart representation of FIG. 4 organizes method 100 into discrete task groupings or logic blocks. For each block, the described functionality is programed into the controller 50 and/or user interface device 52 shown schematically in FIG. 1, and is performed using corresponding sensors, communications equipment and protocols, digital signal processing hardware, etc., as will be readily appreciated by those possessing ordinary skill in the art.

Commencing at block B102 ("REC $CC_{52}$"), the controller 50 receives the operator-requested drive mode signal (arrow $CC_{52}$) as an electrical signal from the user interface device 52, with the operator-requested drive mode signal (arrow $CC_{52}$) being indicative of an operator's desired drive mode when using the electric propulsion system 10 of FIG. 1. The method 100 then proceeds to block B104.

Block B103 ("FLT?"), which runs concurrently with the above-described block B102 and other blocks of the method 100, may include detecting an electrical fault or limit condition of the electric propulsion system 10. This may encompass a wide range of possible conditions, such as but not limited to an electrical short, open-circuit condition, extreme high or low temperature of the RESS 11, the TPIM 18, the rotary electric machine 12, a high current and/or overvoltage condition, etc. In response to such an electrical fault condition, the method 100 of FIG. 4 proceeds to block B107. Absent a detected fault condition or limit, however, block B103 is repeated in a controlled loop to monitor for the fault condition or limit on an ongoing basis.

Block B104 ("$CC_{52}=M_{PERF}$") includes determining, via the controller 50, whether the operator-requested drive mode signal (arrow $CC_{52}$) originally received at block B102 is indicative of operator selection of a high performance mode, e.g., a Maximum Power Mode or a Power Boost Mode. The method 100 proceeds to block B106 when the operator has requested such a high performance mode, with the controller 50 proceeding in the alternative to block B105.

Block B105 ("$CC_{52}=M_N$?") is analogous to block B104, and includes determining, via the controller 50, whether the operator-requested drive mode signal (arrow $CC_{52}$) received at block B102 is indicative of operator selection of one of N different efficiency modes $M_N$, e.g., one or more lower-power, higher-efficiency/extended range drive modes corresponding to an available P-connected configuration of the RESS 11. N=1 when the RESS 11 is capable of a single P-connected configuration such as in the FIG. 2 embodiment, with N=2 in the non-limiting alternative configuration of FIG. 3. The method 100 proceeds to block B116 when the operator-requested drive mode signal (arrow $CC_{52}$) corresponds to such a mode, with the controller 50 proceeding in the alternative to block B107.

At block B106 ("DET $P_L$ @ $M_{PERF}$"), the controller 50 in this embodiment automatically determines the electrical loss information associated with operation in the above-noted high performance mode. Optional implementations for block B106 include accessing a lookup table in which such loss information is stored for a corresponding temperature or other operating condition(s), calculating, or estimating the loss information in real-time, etc. The method 100 then proceeds to block B108.

Block B107 ("DFLT") includes executing a default control action, inclusive of establishing either an S-connected configuration or a P-connected configuration depending on the particular application and calibrated setting. Such a default setting, e.g., the P-connected configuration, could be selectable by a user in a possible variation. Block B107 may be reached in response to a failure to select a valid drive mode at blocks B104 and B105, as well as in response to detection of an electrical fault condition at block B103. When reached from block B103, the controller 50 could establish the P-connected configuration, or progressively limit high-speed torque and power performance of the electric propulsion system 10 as needed, e.g., in the S-connected configuration by limiting output power in a fault-specific manner, possibly inclusive of enabling a low-speed/low-torque "limp home" mode or disabling propulsion or charging, delimiting the TPIM 18, or performing other suitable control actions to balance operator expectations with protection of the electric propulsion system 10.

In order to address the possible lack of a mode selection by an operator, the controller 50 is programmed with an appropriate default mode. The default mode in such a scenario may be specific to the electric propulsion system 10. For instance, if the electric propulsion system 10 is used aboard a high-performance vehicle, and assuming the absence of an electrical fault mode, a lack of capacity or low state of charge of the RESS 11, and/or other relevant factors, the controller 50 may automatically default to the S-connected configuration of the RESS 11 by transmitting switching control signals as part of the output signals (arrow $CC_O$) of FIG. 1 to the individual switches 30 to thereby trigger the switching control actions, with such signals possibly being in the form of separate first and second electronic switching control signals commanding a corresponding P-connected or S-connected configuration. The method 100 then returns to block B102.

At block B108 ("$P_L$<CAL1"), the controller 50 next compares the mode-specific electrical loss information determined in block B106 to a calibrated loss limit, i.e., a calibrated or prerecorded value suitable for the corresponding selected drive mode. The method 100 proceeds to block B110 when the electrical losses do not exceed the calibrated loss limit, and to block B109 in the alternative when the electrical losses exceed the calibrated loss limit.

Block B109 ("DISPL OPT =$M_N$") entails selectively presenting an alternative drive mode recommendation (via the user interface device 52 of FIG. 1) when the mode-specific electrical losses associated with the selected desired drive mode, in this instance the performance mode, exceeds the calibrated loss threshold for such a mode. The method 100 then proceeds to block B111.

Block B110 ("EXEC $M_{PERF}$") includes executing the selected drive mode. In the example embodiment of FIG. 4, where the drive mode is a Maximum Power Mode, Power Boost Mode, or another high-performance mode, block B110 entails selecting and implementing the S-connected configuration of the RESS 11 as a selected battery configuration. Thereafter, the controller 50 transmits electronic switching control signals as part of the output signals (arrow $CC_O$) of FIG. 1 to the switching circuit 15 of the RESS 11 to establish the selected S-connected configuration. As appreciated in the art, such electronic switching control signals may be voltage signals delivered to a gate or other control terminal of the switches 30, with the voltage signals having the effect of changing the ON/OFF state of each recipient switch 30 within the switching circuit 15.

At block B111 ("REC $CC_{52}$*"), the controller 50 receives an updated operator-requested drive mode signal (arrow $CC_{52}$*) from the user interface device 52 in response to the displayed alternative option at block B109. In a possible use scenario, an operator selecting the high-performance mode ($M_{PERF}$) at block B102 may, subsequently at block B109, be presented with one or more higher-efficiency/lower power modes corresponding to one or more available P-connected configurations of the RESS 11. The operator, in response to a displayed prompt on the user input device 52, may confirm the original block B102-implemented selection, or the operator may choose to override it, e.g., by touching a corresponding icon on the user interface device 52. The method 100 then proceeds to block B112.

Block B112 ("OVR?") entails processing the input from block B111 to determine whether the operator has elected to override the controller 50-recommended drive mode. The method 100 proceeds to block B110 when this is the case. The method 100 otherwise proceeds to block B116 when the operator has selected one of the drive modes powered via an available P-connected configuration of the RESS 11.

At block B116 ("DET $P_L$ @ $M_N$"), the controller 50 determines the electrical loss information associated with continued operation in one of the higher efficiency modes $M_N$ made possible by a P-connected configuration of the RESS 11. Optional implementations include accessing a lookup table in which such electrical loss information is stored for corresponding operating conditions, or calculating and/or estimating the losses, etc. The method 100 proceeds to block B118 once the controller 50 has determined the electrical loss information associated with operation in mode(s) $M_N$.

Block B118 ("$P_L$<CAL2?") entails comparing the mode-specific electrical loss information from block B116 to a calibrated loss limit via the controller 50 of FIG. 1. The method 100 proceeds to block B119 when the determined electrical losses are less than the calibrated loss limit, and to block B120 in the alternative when such losses exceed the calibrated loss limit.

Block B119 ("EXEC CA") may include executing a suitable control action aboard the electric propulsion system 10 of FIG. 1, with the controller 50 taking such action in response to exceeding the calibrated loss limit at block B118. For instance, in response to determining that the electrical losses associated with a given P-connected configuration of the RESS 11 are still high relative to the calibrated loss limit, the controller 50 may respond in different manners depending upon the available configuration of the RESS 11. When the simplified two-module embodiment of FIG. 2 is used, for instance, actions could be taken to limit the output torque and/or speed of the electric machine 12 when in an available P-connected configuration, typically via PWM-based derating of the TPIM 18. Other actions may be taken, such as cooling of the RESS 11 via the cooling system 27* of FIG. 1, recommending a charging operation to the operator, etc., depending on the magnitude by which the calibrated loss limit is exceeded. The method 100 then returns to block B102.

At block B120 ("EXEC $M_N$"), the controller 50 executes the selected higher-efficiency drive mode and its corresponding P-connected configuration. To this end, the controller 50 transmits electronic switching control signals as part of the output signals (arrow $CC_O$) of FIG. 1, thereby establishing the selected P-connected configuration. The method 100 thereafter returns to block B102.

The method 100 of FIG. 4 may be executed in some embodiments in response to predetermined entry conditions. For example, the controller 50 of FIG. 1 may detect an onset of a drive cycle, such as by detecting a key-on event in which the operator turns on the electric propulsion system 10 prior to placing the transmission 14 in gear. Such an approach may permit the controller 50 to receive the operator-requested drive mode signal (arrow $CC_{52}$) via the user interface device 52 at the onset of the drive cycle. Other embodiments may permit receipt of the operator-requested drive mode signal (arrow $CC_{52}$) via the user interface device 52 of FIG. 1 during the ongoing drive cycle, i.e., after the above-noted key-on event and prior to a subsequent key-off event terminating the drive cycle.

Thus, embodiments may be envisioned which enable commanding of a transition from the P-connected configuration to the S-connected configuration of the RESS 11, or vice versa, during the course of the ongoing drive cycle. Still other embodiments may include detecting when the electric propulsion system 10 is stationary, for instance at a red light or when at a standstill in heavy traffic, such as by processing a speed signal from wheel speed sensors, transmission output speed sensors, etc., as well understood in the art. Thereafter, the controller 50 may command the transition from the P-connected configuration to the S-connected configuration, or vice versa, during the drive cycle only when the electric propulsion system 10 is stationary.

Figure 5:
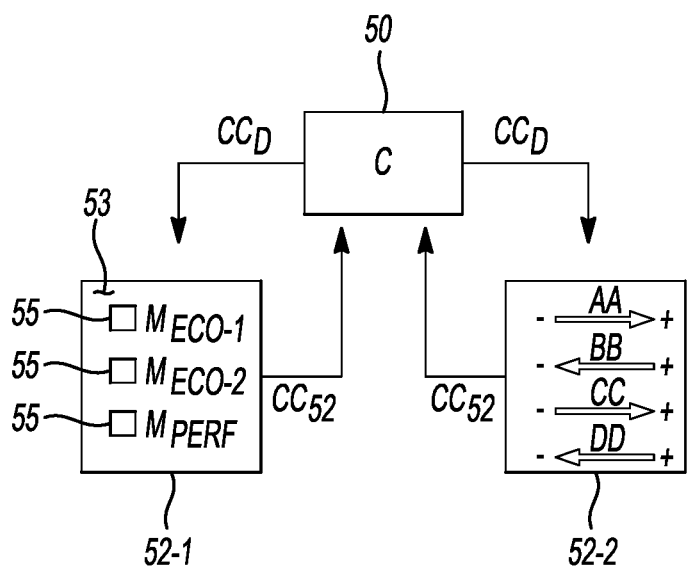
FIG. 5 is a simplified illustration of a user interface device configured to display a mode-specific electric vehicle range and/or power level in the course of performance of the present method.

Referring to FIG. 5, implementation of the present method 100 is intended to involve an intuitive user-friendly interaction between the operator of the electric propulsion system 10 shown in FIG. 1 and the controller 50. Such interaction is facilitated by the intervening user interface device 52. As depicted in FIG. 5, the user interface device 52 could be configured to display a mode selection screen 52-1, e.g., via a touch screen 53. One or more P-connected higher efficiency modes ($M_{ECO-1}$, $M_{ECO-2}$) may be displayed with corresponding icons 55. An S-connected high-performance mode ($M_{PERF}$) e.g., a Maximum Power Mode or a Power Boost Mode, may be displayed with its own corresponding icon 55. When the operator touches an icon 55 on the mode selection screen 52-1 for a given displayed mode, the user interface device 52 transmits an operator-requested drive mode signal (arrow $CC_{52}$) to the controller 50.

In response to the operator-requested drive mode signal (arrow $CC_{52}$), the controller 50 executes the method 100 as set forth above, with receipt of the operator-requested drive mode signal (arrow $CC_{52}$) corresponding to the above-described block B102 of FIG. 4. As part of the present method 100, the controller 50 may transmit display control signals (arrow $CC_D$) to the user interface device 52 to cause the user interface device 52 to display a particular set of information, including the mode selection screen 52-1 noted above.

Additionally, the display control signals (arrow $CC_D$) may cause the user interface device 52 to display a mode effects screen 52-2. For example, the controller 50 may be configured to present an electric range or efficiency bonus (+), indicated as arrow AA, or an electric range or efficiency penalty (−) as indicated by arrow BB. Similarly, the display control signals (arrow $CC_D$) could cause the user interface device 52 to display an output power bonus (+), i.e., arrow CC, or an output power penalty (−), as indicated by arrow DD. The electric range/efficiency and/or output power penalty or bonus that would be realized by implementing the operator's particular drive mode recommendation may be based on the above-described mode-specific electrical loss information, or possibly other criteria in alternative embodiments.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed:

1. An electric propulsion system comprising:
    a rotary electric machine having an output member connectable to a driven load, wherein the output member is configured to impart an output torque from the rotary electric machine to the driven load;
    a rechargeable energy storage system ("RES S") that is electrically connected to the rotary electric machine, including:
        multiple battery modules; and
        a switching circuit configured, in response to a respective first or second electronic switching control signal, to selectively interconnect the multiple battery modules in a parallel-connected ("P-connected") configuration or a series-connected ("S-connected") configuration;
    a user interface device configured to receive an operator-requested drive mode request indicative of a desired drive mode of the electric propulsion system; and a controller in communication with the user interface device and programmed with mode-specific electrical loss information associated with the desired drive mode, wherein the controller is configured to select and establish the P-connected configuration or the S-connected configuration, as a selected battery configuration via the first or second electronic switching control signal, in response to the operator-requested drive mode request, and to selectively present a drive mode recommendation via the user interface device when the mode-specific electrical loss information exceeds a calibrated loss threshold.

2. The electric propulsion system of claim 1, wherein the controller is configured to detect an onset of a drive cycle, and to receive the operator-requested drive mode request via the user interface device at the onset of the drive cycle.

3. The electric propulsion system of claim 2, wherein the controller is configured to receive the operator-requested drive mode request via the user interface device during the drive cycle, and to command a transition from the P-connected configuration to the S-connected configuration, or vice versa, during the drive cycle.

4. The electric propulsion system of claim 3, wherein the controller is configured to command the transition from the P-connected configuration to the S-connected configuration, or vice versa, during the drive cycle only when the electric propulsion system is stationary.

5. The electric propulsion system of claim 1, wherein the controller is configured to detect an electrical fault condition or limit of the electric propulsion system, and to automatically select the P-connected configuration or limit output power of the S-configuration in response to the electrical fault condition or limit.

6. The electric propulsion system of claim 5, further comprising:
a cooling system configured to regulate a temperature of the rotary electric machine, wherein the electrical fault or limitation includes an electrical fault or limitation of the cooling system and/or the temperature of the rotary electric machine.

7. The electric propulsion system of claim 1, wherein the P-connected configuration includes multiple different P-connected configurations.

8. The electric propulsion system of claim 7, wherein the switching circuit includes nine or more switches.

9. The electric propulsion system of claim 1, wherein the controller is configured to present, via the user interface device, an electric range and/or power penalty or bonus for the drive mode recommendation based on the mode-specific electrical loss information.

10. The electric propulsion system of claim 1, further comprising the driven load, wherein the driven load includes a set of road wheels of a motor vehicle.

11. A mode selection method for an electric propulsion system, the electric propulsion system having a rotary electric machine that is connectable to a driven load and a rechargeable energy storage device ("RESS") connected to the rotary electric machine, the method comprising:
determining, via a controller, mode-specific electrical loss information associated with a desired drive mode of the electric propulsion system;
selectively presenting a drive mode recommendation via a user interface device when the mode-specific electrical loss information associated with the desired drive mode exceeds a calibrated loss threshold;
receiving an operator-requested drive mode request from the user interface device, via the controller, wherein the operator-requested drive mode signal is indicative of the desired drive mode of the electric propulsion system;
in response to the operator-requested drive mode request, selecting either a parallel-connected ("P-connected") configuration or a series-connected ("S-connected") configuration of the RESS as a selected battery configuration, via a first or second electronic switching control signal, respectively, wherein the RESS includes multiple battery modules and a switching circuit; and
transmitting the first or second electronic switching control signal to the switching circuit of the RESS, via the controller, to establish the selected battery configuration.

12. The method of claim 11, further comprising:
detecting an onset of a drive cycle via the controller; and
receiving the operator-requested drive mode request via the user interface device at the onset of the drive cycle.

13. The method of claim 12, further comprising:
receiving the operator-requested drive mode request via the user interface device during the drive cycle; and
commanding a transition from the P-connected configuration to the S-connected configuration, or vice versa, during the drive cycle.

14. The method of claim 13, further comprising:
detecting when the electric propulsion system is stationary; and
commanding the transition from the P-connected configuration to the S-connected configuration, or vice versa, during the drive cycle only when the electric propulsion system is stationary.

15. The method of claim 11, further comprising:
detecting an electrical fault condition or limit of the electric propulsion system; and
automatically selecting the P-connected configuration or limiting output power of the S-configuration in response to the electrical fault condition or limit.

16. The method of claim 15, wherein the electric powertrain system includes a cooling system configured to regulate a temperature of the rotary electric machine, the method further comprising, wherein automatically selecting the P-connected configuration in response to the electrical fault condition or limit occurs in response to a fault or limitation of the cooling system.

17. The method of claim 11, wherein the switching circuit includes nine or more switches, and wherein selecting the P-connected configuration or the S-connected configuration of the RESS includes controlling an ON/OFF state of each respective one of the nine or more switches of the switching circuit.

18. The method of claim 11, further comprising:
presenting, via the user interface device using the controller, an electric range and/or power penalty or bonus for the drive mode recommendation based on the mode-specific electrical loss information.

19. A motor vehicle comprising:
a set of road wheels;
a vehicle body connected to the set of road wheels; and
an electric propulsion system connected to the set of road wheels and the vehicle body, including:
a polyphase rotary electric machine having a set of phase leads and an output member, the output member being connected to the set of road wheels and configured to impart a motor torque to the set of road wheels;

a rechargeable energy storage system ("RESS") that is electrically connected to the polyphase rotary electric machine, including:
a plurality of battery modules; and
a switching circuit having a plurality of switches and configured, in response to first or second electronic switching control signals, respectively, to selectively connect the plurality of battery modules in a parallel-connected ("P-connected") configuration or a series-connected ("S-connected") configuration;
a user interface device configured to receive an operator-requested drive mode request indicative of a desired drive mode of the electric propulsion system; and
a controller in communication with the user interface and programmed with mode-specific electrical loss information associated with the desired drive mode, wherein the controller is configured to receive the operator-requested drive mode request via the user interface device during the desired drive mode, to select one of the P-connected configuration or the S-connected configuration via control of the switching circuit in response to the operator-requested drive mode request, and to present a drive mode recommendation and an expected electric range and power penalty or bonus for the drive mode recommendation based on the mode-specific electrical loss information via the user interface device when the mode-specific electrical loss information exceeds a calibrated loss threshold.

20. The motor vehicle of claim 19, wherein the plurality of battery modules includes four or more battery modules, and the plurality of switches includes at least nine switches.

\* \* \* \* \*